United States Patent [19]

Morgan

[11] Patent Number: 4,605,465
[45] Date of Patent: Aug. 12, 1986

[54] UV AND THERMALLY CURABLE, THERMOPLASTIC-CONTAINING COMPOSITIONS

[75] Inventor: Charles R. Morgan, Brookeville, Md.

[73] Assignee: W. R. Grace & Co., New York, N.Y.

[21] Appl. No.: 657,607

[22] Filed: Oct. 4, 1984

Related U.S. Application Data

[63] Continuation of Ser. No. 526,636, Aug. 26, 1983, abandoned, which is a continuation-in-part of Ser. No. 371,684, Apr. 26, 1982, abandoned.

[51] Int. Cl.[4] ............................................. B32B 31/00
[52] U.S. Cl. ................................. 156/273.3; 522/7; 522/12; 522/13; 522/17; 522/19; 522/21; 522/24; 522/27; 156/275.5; 156/275.7; 156/307.5; 156/330; 156/332; 156/333; 427/54.1; 525/119; 525/121; 525/263; 525/305; 525/309
[58] Field of Search ............... 156/305, 273.3, 330, 156/275.5, 332, 275.7, 333, 307.5; 427/54.1; 525/119, 305, 121, 309, 263; 204/159.15, 159.16, 159.17

[56] References Cited

U.S. PATENT DOCUMENTS

| | | | |
|---|---|---|---|
| 3,616,040 | 10/1971 | Toback | 156/332 |
| 3,652,733 | 3/1972 | Davenport | 260/884 |
| 3,840,448 | 10/1974 | Osborn et al. | 204/159.17 |
| 3,850,675 | 11/1974 | Miller | 427/54.1 |
| 3,989,610 | 11/1976 | Tsukada et al. | 525/119 |
| 4,020,233 | 4/1977 | Morgan | 428/419 |
| 4,288,527 | 9/1981 | Morgan | 204/159.16 |
| 4,309,331 | 6/1982 | Graham | 260/30.6 R |
| 4,339,474 | 7/1982 | Kishida et al. | 427/54.1 |
| 4,444,806 | 4/1984 | Morgan et al. | 156/275.5 |

FOREIGN PATENT DOCUMENTS 2046269 11/1980 United Kingdom .

Primary Examiner—John J. Gallagher
Attorney, Agent, or Firm—Richard P. Plunkett; William W. McDowell, Jr.

[57] ABSTRACT

A UV and thermally curable composition comprising
(1) a liquid, ethylenically unsaturated monomer, oligomer or prepolymer of the formula:

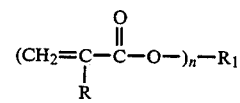

wherein R is H or $CH_3$, $R_1$ is an organic moiety and n is at least 2, (2) a thermal initiator for (1) selected from the group consisting of substituted or unsubstituted pinacols, azo compounds, thiurams, organic peroxides and mixtures thereof, (3) a photoinitiator for (1) selected from the group consisting of aldehyde and ketone carbonyl compounds having at least one aromatic nucleus attached directly to the

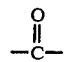

group, benzoin alkyl ethers, diethoxyacetophenone and 2,2-dimethoxy-2-phenylacetophenone, (4) a thermoplastic material, and
(5) a non-polymerizable plasticizer for (4).

The exposure of the composition to UV radiation under atmospheric conditions and heat in seriatim results in a cured solid product which can be utilized as adhesives, coatings, gaskets, sealants, resists and the like.

10 Claims, No Drawings

UV AND THERMALLY CURABLE, THERMOPLASTIC-CONTAINING COMPOSITIONS

This application is a continuation of my copending application having Ser. No. 526,636, filed Aug. 26, 1983, now abandoned, which, in turn, is a continuation-in-part of my copending application having Ser. No. 371,684, filed Apr. 26, 1982, and now abandoned.

This invention is directed to radiation and heat activated compositions. More particularly, this invention relates to radiation and heat activated compositions comprising an acrylate terminated material, a thermoplastic polymer in combination with a plasticizer for the thermoplastic polymer, a photoinitiator and a thermal initiator.

BACKGROUND OF THE INVENTION

It is known from U.S. Pat. No. 4,020,233 to form cured polythioethers by admixing the composition comprising an ethylenically unsaturated compound containing at least two unsaturated carbon-to-carbon bonds per molecule, a polythiol containing at least two thiol groups per molecule, a photoinitiator and a catalytic amount of a pinacol and, thereafter, subjecting the admixture to UV radiation and heat. It is also known from U.S. Pat. No. 3,652,733 to form cured polythioether products from a composition comprising a polymerizable plasticizer having an average of 2–5 carbon-to-carbon unsaturated groups per molecule, a thermoplastic polymer selected from the group consisting of polyvinyl chloride and copolymers of vinyl chloride with vinyl acetate, a polythiol, and a photoinitiator by exposing said composition to UV radiation after fluxing the thermoplastic polymer at temperatures between 100° and 200° C. The polythiol is a necessary ingredient to assure that the plasticizer is completely cured and thus does not exude from the product. It is further known from U.S. Pat. No. 4,309,331 to form photosensitive dispersions of acrylic resins in combination with a nonvolatile ethylenically unsaturated compound and a photoinitiator. It is also known from U.S. Pat. No. 4,288,527 to UV and heat cure in seriatim compositions of unsaturated acrylic or methacrylic monomers or prepolymers in combination with a photoinitiator and a substituted or unsubstituted pinacol. Further, it is known from British Patent Application 2,046,269A to photopolymerize a composition of an epoxidic prepolymer and a vinyl chloride dispersion polymer in the presence of specific photoinitiators which decompose on exposure to electromagnetic radiation. It is also known from U.S. Pat. No. 3,840,448 to cure acrylate compositions in an inert atmosphere to obtain skin cures. Further, U.S. Pat. No. 3,989,610 teaches a composition consisting of (1) a photopolymerizable, unsaturated compound containing at least two terminal ethylene groups, (2) a photosensitizer for (1), (3) an epoxy containing at least two epoxy groups and (4) a thermal initiator for the epoxy compound. The curing process involves UV curing of the photopolymerizable unsaturated compound followed by heat curing of the epoxy compound.

One object of the instant invention is to produce a composition which can be dual UV and heat cured. Another object of this invention is to produce cured products by exposing the composition to UV radiation under atmospheric conditions followed by the application of heat. Still another object is to produce a composition which, when applied to an irregular surface containing shadow areas inaccessible to UV radiation, will cure in these areas during the heat cure. Yet another object of the invention is to produce a composition which on exposure to UV radiation under atmospheric conditions will skin-cure sufficiently to maintain the composition in situ, e.g., without any runoff or sag so that the composition is properly positioned for the heat cure which follows. Other objects will become apparent from a reading hereinafter.

OUTLINE OF THE PRESENT INVENTION

The present invention is directed to a UV and thermally curable composition comprising
(1) a liquid, ethylenically unsaturated monomer, oligomer or prepolymer of the formula:

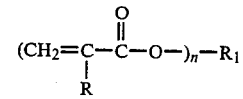

wherein R is H or $CH_3$, $R_1$ is an organic moiety and n is at least 2,
(2) a thermal initiator for (1) selected from the group consisting of substituted or unsubstituted pinacols, azo compounds, thiurams, organic peroxides and mixtures thereof,
(3) a photoinitiator for (1) selected from the group consisting of aldehyde and ketone carbonyl compounds having at least one aromatic nucleus attached directly to the

group, benzoin alkyl ethers, diethoxyacetophenone and 2,2-dimethoxy-2-phenylacetophenone,
(4) a thermoplastic material, and
(5) a non-polymerizable plasticizer for (4).

In the above composition, the thermoplastic material can be added separately or as a plastisol, e.g., a dispersion of a vinyl resin in a liquid plasticizer. The exposure of the composition to UV radiation under atmospheric conditions and heat in seriatim results in a cured solid product which can be utilized as adhesives, coatings, gaskets, sealants, encapsulants, resists and the like.

Vinyl chloride homopolymers and copolymers containing same have excellent resistance to chemical attack and to abrasion and have good adhesion properties. They are therefore well suited for use as protective coatings or adhesives. It is sometimes desirable to apply these vinyl resins in the form of a composition containing a plasticizer, e.g., as a plastisol. While it has been proposed to use polymerizable plasticizers, e.g., diallylphthalate, together with a free radical initiator such as t-butyl perbenzoate which reacts on heating, the curing of such plasticizers is difficult to control. Furthermore, in current practice, many heat curable adhesives or sealants are applied at room temperature and then passed through high pressure water cleaning hoses, as in the automotive industry, and then heated to cause the curing reaction. However, during the passage through the wash-off, some or all of the adhesive or sealant is removed causing gaps in the adhesive or sealant resulting in less adhesion or in inadequate sealing. By use of the composition of the instant invention the composition in the form of an adhesive or sealant can be applied at room temperature, exposed for a short time to UV radiation under atmospheric conditions to set the surface thereby improving wash-off resistance and eliminate sagging and then can be finally through-cured by heating. Furthermore, in certain systems in which UV light cannot penetrate because of geometrical constraints causing shadow areas or in systems rendered partially UV opaque due to fillers, it is desirable to have a system which is dual UV/heat cured. By use of a dual cure, the composition exposed to the UV light can be radiation cured and the part of the composition in the shadow areas can be heat cured.

DETAILED DESCRIPTION OF THE INVENTION

It has now been found that cured products can be obtained from a composition comprising (1) a liquid, ethylenically unsaturated monomer, oligomer or prepolymer of the formula:

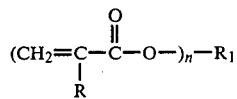

wherein R is H or $CH_3$, $R_1$ is an organic moiety and n is at least 2, (2) a thermal initiator for (1) selected from the group consisting of substituted or unsubstituted pinacols, azo compounds, thiurams, organic peroxides and mixtures thereof, (3) a photoinitiator for (1) selected from the group consisting of aldehyde and ketone carbonyl compounds having at least one aromatic nucleus attached directly to the

group, benzoin alkyl ethers, diethoxyacetophenone and 2,2-dimethoxy-2-phenylacetophenone, (4) a thermoplastic material, and (5) a non-polymerizable plasticizer for (4) by exposing said composition to UV radiation under atmospheric conditions and then heat in seriatim.

Although the aforesaid compositions, per se, are operable herein to form useful products, they may also be used in combination with conventional copolymerizable monomeric compounds or reactive diluents. The admixture of the composition of the instant invention with other monomers is employed usually to control viscosity and other application variables such as rate of cure as well as final film properties such as hardness and flexibility. Reactive diluents include, but are not limited to, monofunctional acrylic esters, monofunctional methacrylic esters, styrene, vinyl-toluene, acrylonitrile, methacrylonitrile, vinyl chloride, vinylidene chloride, butadiene, isoprene, chloroprene, divinyl benzene, di(-vinyl-phenyl)carbonate, diallyl phthalate, diallyl carbonate, di-(allylphenyl)carbonate, diallyl furmarate, triallyl isocyanurate, triallyl cyanurate, diallyl chlorendate, diallyl maleate and unsaturated polyesters and mixtures thereof. By the term unsaturated polyesters herein is meant the usual polycondensation products which consist of ester-like linked residues of polyvalent, especially divalent, alcohols, as well as possibly also residues of monovalent alcohols and/or of monovalent carboxylic acids, selected so that residues must contain at least some unsaturated groups. Examples of acids include maleic acid, fumaric acid, itaconic acid, mesaconic acid, citraconic acid, succinic acid, glutaric acid, adipic acid, phthalic acid, tetrachlorophthalic acid, hexachloroendomethylenetetrahydrophthalic acid, trimellitic acid, benzoic acid, linseed oil fatty acid and ricinoleic fatty acid and mixtures thereof. Examples of alcohols include ethylene glycol, diethylene glycol, propane, butane and hexane diols, trimethylolpropane, pentaerythritol, butanol and tetrahydrofurfuryl alcohol.

The reactive diluents can be added to the system in amounts ranging up to 90% by weight of the ethylenically unsaturated monomer, oligomer or prepolymer, preferably 20 to 50% by weight on the same basis.

The thermoplastic material operable herein is any conventional thermoplastic, preferably a vinyl resin. The vinyl resins include both homopolymer and copolymers of vinyl resins from monomers containing the vinyl radical ($CH_2$=CH—) or vinylidene radical ($CH_2$=C=). The term "copolymers" includes terpolymers, tetrapolymers, etc. Vinyl resins from monomers containing the vinyl radical ($CH_2$=CH—) or vinylidene radical ($CH_2$=C=) operable herein as the thermoplastic material include polyvinyl chloride, polyvinylidene chloride, styrene, polyvinyl acetate, polyvinyl alcohol, polyvinyl formal, polyvinyl fluoride, acrylic and methacrylic acid and their esters. Operable copolymers of vinyl monomers include copolymers of vinyl chloride and vinyl acetate or a copolymer of vinyl acetate with another vinyl monomer. Copolymers of vinyl monomers and alpha-olefin include ethylene-vinyl acetate copolymers, ethylene-acrylic acid, ethylene-ethylacrylate, ethylene-methyl acrylate, vinyl chloride-propylene and ethylene-vinyl alcohol. Recent additions to the PVC group operable herein include graft copolymers in which ethylene-vinyl acetate and ethylene-propylene diene monomer have been incorporated. Mixtures of the above can also be used.

The vinyl resins may be added to the composition per se along with a separate plasticizer therefor or in the form of a vinyl plastisol. As used herein, the term "vinyl plastisol" refers to a dispersion of the vinyl resin in a liquid plasticizer.

The composition must also contain various conventional non-polymerizable plasticizers for the thermoplastic polymer including, but not limited to, dimethyl adipate, di-n-propyl adipate, diisobutyl adipate, dibutoxyethyl adipate, bis(2-ethylhexyl)adipate, diisodecyl adipate, bis(2-ethylhexyl)azelate, diethylene glycol di-benzoate, dipropylene glycol di-benzoate, octylene glycol di-benzoate, tributyl citrate (acetyl), tris(2-ethylhexyl)citrate (acetyl), triethylene glycol di-2-ethylhexoate, polyethylene glycol di-2-ethylhexoate, butyl phthalyl butyl glycolate, bis(2-ethylhexyl)hexahydroisophthalate, bis(2-ethylhexyl)hexahydrophthalate, hydrogenated terphenyls, bis(2-ethylhexyl)isophthalate, diisodecyl isophthalate, triethyl phosphate, tricresyl phosphate, cresyl diphenyl phosphate, isooctyl diphenyl phosphate, tributyl phosphate, 2-ethylhexyl diphenyl phosphate, isodecyl diphenyl phosphate, tri-n-hexyl phosphate, bis(2-ethylhexyl)phenyl phosphate, tris(2-ethylhexyl)phosphate, diethyl phthalate, dimethyl phthalate, butyl benzyl phthalate, butyl cyclohexyl phthalate, dibutyl phthalate, di-n-hexyl phthalate, butyl octyl phthalate, butyl decyl phthalate, diisooctyl phthalate, bis(2-ethylhexyl)phthalate, di-n-octyl phthalate, dicapryl phthalate, diisodecyl phthalate, di-n-nonyl phthalate, di-n-decyl phthalate, ditridecyl phthalate, bis(2-ethylhexyl)sebacate, butyl stearate and bis(2-ethylhexyl)terephthalate. Additionally, polyesters having various tradenames including Plastolein 9720, commercially available from Emery Industries, Inc., Santicizer 462 and 409, commercially available from Monsanto Co., Paraplex G-30, commercially available from Rohm and Haas Co., Harflex 300, commercially available from Harchem Div., Wallace & Tiernan, Inc., NP-10, commercially available from Eastman Chemical Products, Inc., Paraplex G-54, commercially available from Rohm and Haas Co., and Morflex P-50, commercially available from Pfizer & Co., Inc., are also operable herein as unpolymerizable plasticizers.

Although these plasticizers are conventional in that they function to facilitate processing by increasing flexibility, in the instant invention they also perform a second function. Ordinarily, when an acrylate is photocured under atmospheric conditions, a tacky surface is obtained due to oxygen inhibition. It has been found surprisingly in the instant invention that, when a plasticizer and a thermoplastic material are present during photocuring, oxygen inhibition is precluded, thereby allowing one to obtain a tack-free surface on photocuring of the acrylate containing composition herein. This is an important discovery since it allows one to photocure acrylates without employing costly and unwieldy nitrogen or other inert atmospheric systems. The plastisol formulations typically comprise 100 parts of the vinyl resin with 60–100 parts of the plasticizer. The plastisol may include one or more heat stabilizers for the vinyl resin. The amount to be employed is determined by consideration of the temperatures to which the composition must be heated for application and the temperatures which will be encountered in use. Generally about 0.5–5% by weight of heat stabilizer, based on the vinyl resin, will be employed. Conventional heat stabilizers used herein include, but are not limited to, basic lead carbonate, lead acetate, lead stereate, lead oleate, calcium stearate, dibutyl tin dilaurate and barium-cadmium tin complexes.

The relative amounts of the thermoplastic material and the curable, ethylenically unsaturated compound can vary between wide limits depending on the end use. Thus, weight ratios of the curable ethylenically unsaturated compound to the thermoplastic material in the range 20:1 to 1:20, preferably in the range 20:1 to 1:5 are operable herein.

The thermal initiators used herein for curing the ethylenically unsaturated compound of the composition are free radical initiators including, but not limited to, substituted or unsubstituted pinacols, azo compounds, thiurams, organic peroxides and mixtures thereof.

The organic peroxides operable are of the general formula:

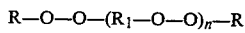

wherein n=0 or 1, R is independently selected from hydrogen, aryl, alkyl, aryl carbonyl, alkaryl carbonyl, aralkyl carbonyl and alkyl carbonyl and R$_1$ is alkyl or aryl, said alkyl groups containing 1 to 20 carbon atoms.

Examples of operable organic peroxides include, but are not limited to 2,5-dimethyl-2,5-di(t-butylperoxy)-hexane, 1,3-bis(t-butylperoxyisopropyl)benzene, 1,3-bis-(cumylperoxyisopropyl)benzene, 2,4-dichlorobenzoyl peroxide, caprylyl peroxide, lauroyl peroxide, t-butyl peroxyisobutyrate, benzoyl peroxide, p-chlorobenzoyl peroxide, hydroxyheptyl peroxide, di-t-butyl diperphthalate, t-butyl peracetate, t-butyl perbenzoate, dicumyl peroxide, 1,1-di(t-butylperoxy)-3,3,5-trimethylcyclohexane, di-t-butyl peroxide and t-butyl hydroperoxide.

The organic peroxide is added to the composition in an amount ranging from 0.01–10%, preferably 0.1–5%, by weight based on the weight of the ethylenically unsaturated compound.

Examples of azo compounds operable herein include, but are not limited to, commercially available compounds such as 2-t-butylazo-2-cyanopropane; 2,2'-azobis-(2,4-dimethyl-4-methoxy-valeronitrile); 2,2'-azobis-(isobutyronitrile); 2,2'-azobis(2,4-dimethylvaleronitrile) and 1,1'-azobis(cyclohexanecarbonitrile).

The azo compound is added to the composition in an amount ranging from 0.001–5%, preferably 0.01–2% by weight based on the weight of the ethylenically unsaturated compound.

The thiurams operable as thermal initiators herein are of the formula:

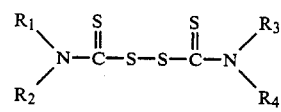

wherein R$_1$, R$_2$, R$_3$ and R$_4$ taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, arkaryl having from 6 to about 12 ring carbon atoms, aralkyl having from 6 to about 12 ring carbon atoms and, when taken together, R$_1$ and R$_2$ and R$_3$ and R$_4$ can each be a divalent alkylene group ($-C_nH_{2n}-$) having from 2 to about 12 carbon atoms, a divalent alkenylene group ($-C_nH_{2n-2}-$) having from 3 to about 10 carbon atoms, a divalent alkadienylene group ($-C_nH_{2n-4}-$) having from 5 to about 10 carbon atoms, a divalent alkatrienylene group ($-C_nH_{2n-6}-$) having from 5 to about 10 carbon atoms, a divalent alkylene oxyalkylene group ($-C_xH_{2x}-OC_xH_{2x}-$) having a total of from 4 to about 12 carbon atoms or a divalent alkyleneaminoalkylene group

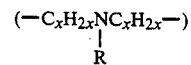

having a total of from 4 to about 12 carbon atoms.

Operable thiurams include, but are not limited to, tetramethylthiuram disulfide, tetraethylthiuram disulfide, di-N-pentamethylenethiuram disulfide, tetrabutylthiuram disulfide, diphenyldimethylthiuram disulfide, diphenyldiethylthiuram disulfide and diethyleneoxythiuram disulfide and the like.

The thiuram is added to the composition in an amount ranging from 0.005–5.0% by weight of the ethylenically unsaturated compound.

The substituted or unsubstituted pinacols operable herein as a thermal initiator have the general formula:

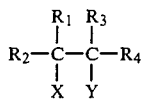

wherein $R_1$ and $R_3$ are the same or different substituted or unsubstituted aromatic radicals, $R_2$ and $R_4$ are substituted or unsubstituted aliphatic or aromatic radicals and X and Y which may be the same or different are hydroxyl, alkoxy or aryloxy.

Preferred pinacols are those wherein $R_1$, $R_2$, $R_3$ and $R_4$ are aromatic radicals, especially phenyl radical and X and Y are hydroxyl.

Examples of this class of compounds include, but are not limited to, benzopinacol, 4,4'-dichlorobenzopinacol, 4,4'-dibromobenzopinacol, 4,4'-diiodobenzopinacol, 4,4',4'',4'''-tetrachlorobenzopinacol, 2,4-2',4'-tetrachlorobenzopinacol, 4,4'-dimethylbenzopinacol, 3,3'-dimethylbenzopinacol, 2,2'-dimethylbenzopinacol, 3,4-3',4'-tetramethylbenzopinacol, 4,4'-dimethoxybenzopinacol, 4,4',4'',4'''-tetramethoxybenzopinacol, 4,4'-diphenylbenzopinacol, 4,4'-dichloro-4'',4'''-dimethylbenzopinacol, 4,4'-dimethyl-4'',4'''diphenylbenzopinacol, xanthonpinacol, fluorenonepinacol, acetophenonepinacol, 4,4'-dimethylacetophenone-pinacol, 4,4'-dichloroacetophenonepinacol, 1,1,2-triphenylpropane-1,2-diol, 1,2,3,4-tetraphenylbutane-2,3-diol, 1,2-diphenylcyclobutane-1,2-diol, propiophenone-pinacol, 4,4'-dimethylpropiophenone-pinacol, 2,2'-ethyl-3,3'-dimethoxypropiophenone-pinacol, 1,1,1,4,4,4-hexafluoro-2,3-diphenyl-butane-2,3-diol.

As further compounds according to the present invention, there may be mentioned: benzopinacol-monomethylether, benzopinacol-mono-phenylether, benzopinacol and monoisopropyl ether, benzopinacol monoisobutyl ether, benzopinacol mono(diethoxy methyl)ether and the like.

The pinacol is added to the composition in amounts ranging from 0.01–10%, preferably 0.1–5%, by weight based on the weight of the ethylenically unsaturated compound.

The thermal and photoinitiators can be added to the system in various ways. That is, the initiators, per se, can be admixed with the ethylenically unsaturated compound. Additionally, the initiators can be dissolved or suspended in a minor amount of well known commercially available solvents such as ketones, e.g., acetone and methyl ethyl ketone or chlorinated hydrocarbons such as methylene chloride, and then added to the system.

In practicing the instant invention, the components of the composition can be present in widely varying amounts depending on the end use of the composition. That is, the ethylenically unsaturated compound can be present in an amount ranging from 5 to 95% by weight with the balance to 100% being made up by the thermoplastic material with non-reactive plasticizers, fillers, diluents and other conventional additives. The percentages of thermal and photoinitiators used have previously been set out herein and are based on the weight percent of the ethylenically unsaturated compound.

The compositions of the present invention may, if desired, include such additives as antioxidants, dyes, inhibitors, fillers, pigments, antistatic agents, flame-retardant agents, thickeners, thixotropic agents, surface-active agents, viscosity modifiers, extending oils, tackifiers and the like within the scope of this invention.

Such additives are usually preblended with the ethylenically unsaturated compound prior to or during the compounding step. Operable fillers include natural and synthetic resins, glass fibers, wood flour, clay, silica, alumina, carbonates, oxides, hydroxides, silicates, glass flakes, borates, phosphates, diatomaceous earth, talc, kaolin, barium sulfate, calcium sulfate, antimony oxide and the like. The aforesaid additives may be present in quantities up to 500 parts or more per 100 parts of the ethylenically unsaturated compound by weight and preferably about 0.005 to about 300 parts on the same basis.

Additionally, scavengers and antioxidants such as hydroquinone, pyrogallol, phosphorous acid, tert-butyl hydroquinone, tert-butyl catechol, p-benzoquinone, 2,5-diphenylbenzoquinone, 2,6-di-tert-butyl-p-cresol, etc., are added to the system in conventional amounts ranging from 0.001 to 2.0% by weight of the ethylenically unsaturated member.

In practicing the instant invention the composition is preferably subjected to UV radiation followed by heat activation. It is preferable to add photoinitiators in order to initiate the UV reaction. Preferred photoinitiators are the aldehyde and ketone carbonyl compounds having at least one aromatic nucleous attached directly to the

group. Various photoinitiators include, but are not limited to, benzophenone, acetophenone, o-methoxybenzophenone, acenaphthene-quinone, alpha-phenylbutyrophenone, p-morpholinopropionphenone, dibenzosuberone, 4-morpholinobenzophenone, 4'-morpholinodeoxybenzoin, p-diacetylbenzene, 4-aminobenzophenone, 4'-methoxyacetophenone, benzaldehyde, alpha-tetralone, 9-acetylphenanthrene, 2-acetylphenanthrene, 10-thioxanthenone, 3-acetylphenanthrene, 3-acetylindone, 9-fluorenone, 1-indanone, 1,3,5-triacetylbenzene, thioxanthen-9-one, xanthrene-9-one, 7-H-benz[de]anthracen-7-one, 1-naphthaldehyde, 4,4'-bis(dimethylamino)benzophenone, fluorene-9-one, 1'-acetonaphthone, 2'-acetonaphthone, 2,3-butanedione, acetonaphthone, 2,3-butanedione, benz[a]anthracene 7.12 dione, 2-hydroxy-2-methyl-1-phenylpropan-1-one, 1-(4-isopropylphenyl)-2-hydroxy-2-methylpropan-1-one, etc. Another class of photoinitiators is the benzoin ethers, such as benzoin methyl ether, benzoin ethyl ether, benzoin isopropyl ether, benzoin isobutyl ether, benzoin tetrahydropyranyl ether and 2,2-dimethoxy-2-phenylacetophenone. A third class of photoinitiators is exemplified by diethoxyacetophenone and 2,2-dimethoxy-2-phenylacetophenone. The photoinitiator or mixtures thereof are usually added in an amount ranging from 0.0005 to 30% by weight of the ethylenically unsaturated compound.

A class of actinic light useful herein for curing is ultraviolet light and other forms of actinic radiation which are normally found in radiation emitted from the sun or from artificial sources such as Type RS Sunlamps, carbon arc lamps, xenon arc lamps, mercury vapor lamps, tungsten halide lamps and the like. Curing periods may be adjusted to be very short and hence commercially economical by proper choice of ultraviolet source, photoinitiator and concentration thereof, temperature and molecular weight and reactive group functionality of the ethylenically unsaturated compound. UV curing periods of about 1 to 5 seconds duration are possible; for example, in coatings, adhesives and encapsulants.

When UV radiation is used, an intensity of 0.0004 to 60.0 watts/cm$^2$ in the 200–400 nanometer region is usually employed, preferably in the 250–380 nanometer range.

The heating step requires heating the reactants to at least 80° C., preferably in the range 80°–200° C., for periods ranging from 10 seconds to 30 minutes, in order to form the fully cured product.

In practicing the instant invention the dual UV/heat curable composition is admixed in any order and applied to the substrate by various conventional means. Following application the composition is exposed to UV radiation for a short period of time, e.g., about 1 second to 1 minute, and, thereafter, exposed to heat by, e.g., passage through a conventional heating oven for a time sufficient to fully cure the composition to a solid product.

The following examples will aid to explain, but specifically not limit, the instant invention. Unless otherwise noted, all parts and percentages are by weight.

Strength properties of adhesion in shear by tension loading were measured in accord with the procedure set out in ASTM D-1002-72.

All photocuring in the following examples was carried out under atmospheric conditions, i.e., in air at ambient temperatures.

EXAMPLE 1

The following master batches were prepared:

| Components | Parts |
| --- | --- |
| Master Batch (1): | |
| Trimethylolpropane trimethacrylate | 4 |
| "Paraplex" G-54[1] | 8 |
| PVC-7401[2] | 8 |
| "Lupersol" 231[3] | 0.2 |
| "Darocur" 1173[4] | 0.2 |
| Master Batch (2): | |
| Trimethylolpropane trimethacrylate | 4 |
| "Paraplex" G-54 | 8 |
| PVC-7401 | 8 |
| "Lupersol" 231 | 0.02 |
| "Darocur" 1173 | 0.02 |
| Master Batch (3): | |
| Trimethylolpropane trimethacrylate | 4 |
| "Paraplex" G-54 | 8 |
| PVC-7401 | 8 |
| "Darocur" 1173 | 0.2 |
| Benzopinacol | 0.2 |
| Master Batch (4): | |
| Trimethylolpropane trimethacrylate | 4 |
| "Paraplex" G-54 | 8 |
| PVC-7401 | 8 |
| "Darocur" 1173 | 0.2 |
| Azobisisobutyronitrile | 0.2 |
| Master Batch (5): | |
| Trimethylolpropane trimethacrylate | 4 |
| "Paraplex" G-54 | 8 |
| PVC-7401 | 8 |
| "Darocur" 1173 | 0.2 |
| Tetramethylthiuram disulfide[5] | 0.02 |
| Master Batch (6): | |
| Trimethylolpropane trimethacrylate | 4 |
| "Paraplex" G-54 | 8 |
| "Pliovic" WO-2[6] | 8 |
| "Darocur" 1173 | 0.2 |
| "Lupersol" 231 | 0.2 |
| Master Batch (7): | |
| Trimethylolpropane trimethacrylate | 4 |
| "Paraplex" G-54 | 8 |
| PVC-7401 | 8 |
| "Lupersol" 231 | 0.2 |
| "Irgacure" 651[7] | 0.2 |
| Master Batch (8): | |
| 1,6-Hexanediol diacrylate | 4 |
| "Paraplex" G-54 | 8 |
| PVC-7401 | 8 |
| "Lupersol" 231 | 0.20 |
| "Darocur" 1173 | 0.2 |
| Master Batch (9): | |
| Trimethylolpropane trimethacrylate | 2 |
| Diisononylphthalate | 3 |
| "Plex"-4858 F[8] | 0.7 |
| Benzoyl peroxide | 0.1 |
| "Darocur" 1173 | 0.1 |
| Master Batch (10): | |
| Trimethylolpropane trimethacrylate | 4 |
| PVC-7401 | 8 |
| "Lupersol"-231 | 0.1,2 |
| "Darocur" 1173 | 0.12 |

[1] Adipate polyester plasticiser, mol wt 3,000, sp. gravity 1.08, acid number (mg KOH/g) 1.1, saponification (mg KOH/g) 535, commercially available from Rohm & Hass;
[2] A low fusing vinyl acetate-vinyl chloride copolymer dispersion resin, sp. gravity 1.37, sp. viscosity 1.45 in 1% cyclohexanone at 30° C. and K value of 70, commercially available from Diamond Shamrock;
[3] 1,1-bis(t-butyl peroxy)-3,5,5-trimethylcyclohexane, commercially available from Pennwalt.
[4] 2-hydroxy-2-methyl-1-phenyl-propan-1-one, commercial.ly available from Merck.
[5] Recrystallized from boiling chloroform.
[6] A vinyl chloride dispersion resin, commercially available from Goodyear Chemical.
[7] "2,2-dimethoxy-2-phenyl acetophenone, commercially available from Ciba-Geigy.
[8] Terpolymer of 86 parts polymethyl methacrylate, 12 parts polybutyl methacrylate and 2 parts vinyl imidazole, comercially available from Rohm, Darmstadt, West Germany.

The master batches were each made up by combining all the ingredients and stirring until a smooth homogeneous mixture was obtained. The mixture was then deaerated by vacuum.

The following examples will show the ability of the above formulations to provide a skin cure to prevent sagging by use of UV radiation alone.

EXAMPLE 2

Master batch (1) was drawn down on glass substrates to thicknesses of 5, 10 and 30 mils. The coatings were then exposed to UV radiation under atmospheric conditions (air 24° C.) from an Addalux medium pressure Hg lamp for 1 second. In each instance a tack-free skin cure sufficient to hold the coating in place was obtained. The coated substrates were then heated at 140° C. in an air oven for 25 minutes. A solid, cured coating was obtained in all thicknesses.

EXAMPLE 3

Example 2 was repeated except that master batch (2) from Example 1 was employed and the radiation exposure was 4 seconds. At all thicknesses after heating, a tack-free cured, solid coating was obtained.

EXAMPLE 4

A ⅛" thick line of master batch (1) from Example 1 was placed along the contacting sides of 2 pieces of overlapping metal. 2 samples were made up. One of the samples was subjected to UV radiation from an Addalux medium pressure mercury lamp for a 6-second exposure under atmospheric conditions. The two samples were then placed under a forceful stream of water to see if any wash-off occurred. The test sample which had not been subjected to UV radiation had a complete wash-off of the line of master batch (1) in less than 1 second. The test samples with the 6-second UV exposure had no wash-off after 6 seconds under the water stream. Wash-off resistance was due to the skin cure covering the line. The UV exposed sample was then heated at 120° C. in an air oven for 30 minutes. This resulted in a solid adhesive line holding the metal pieces together for each sample.

EXAMPLE 5

A 1.5"×2.125" circuit board containing electronic components was completely coated on all sides with an 80 mil thick encapsulating coating of master batch (1) from Example 1 by dipping. The thus coated circuit board was exposed for 6 seconds under atmospheric conditions to UV radiation on all sides from an Addalux medium pressure Hg lamp to obtain a tack-free, thick skin cure. The board was then heated in an air oven at 120° C. at 30 minutes. The coating was a hard, tack-free solid after heating, and the board and components on the board were completely encapsulated.

EXAMPLE 6

Master batches (3), (4), (5) and (6) from Example 1 were each applied to glass substrates in a thickness of 30 mils. The thus coated substrates were then, under atmospheric conditions, exposed for 4 seconds to an Addalux medium pressure Hg lamp to give a coating with a tack-free skin cure. All the substrates were heated at 140° C. in an air oven for 20 minutes. All the resultant coatings were tack-free solids after heating.

EXAMPLE 7

Master batch (7) from Example 1 was coated on a glass substrate at a thickness of 30 mils. The coating was then exposed to UV radiation under atmospheric conditions for 2 seconds from an Addalux medium pressure Hg lamp. The thus irradiated coating had a tack-free skin cure. Heating the skin cured coating in an air oven at 140° C. for 20 minutes resulted in a completely cured solid.

EXAMPLE 8

Master batch (8) from Example 1 was coated on glass substrates to a thickness of 30 mils. The coating was then exposed to UV radiation for 2 seconds from an Addalux medium pressure Hg lamp under atmospheric conditions. The thus exposed coating was cured on the surface. The thus irradiated coating was then heated in an air oven at 140° C. for 20 minutes resulting in a completely cured, tack-free solid.

EXAMPLE 9

Example 5 was repeated except that Master Batch (2) from Example 1 was used. The coating was a hard, tack-free solid after UV radiation and heating at 120° C. for 30 minutes. The components on the board were completely coated after heating.

EXAMPLE 10

Master Batch (9) from Example 1 was drawn down on glass substrates at a thickness of 30 mils. The composition was then exposed to UV radiation from an Addalux lamp, 24" away, for 5 seconds, to give a tack-free skin cure. The coated substrate was then heated in an air oven at 80° C. for 30 minutes resulting in a tack-free, solid coating.

EXAMPLE 11

Master Batch (10) from Example 1 was drawn down on glass substrates at thicknesses of 10 and 30 mils. The compositions were then exposed at a distance of 24" to UV radiation from an Addalux medium pressure Hg lamp for 2 seconds resulting in a tack-free skin cure. The coated substrates were then heated at 140° C. in an air oven for 20 minutes resulting in solid, tack-free coatings in both thicknesses.

EXAMPLE 12

Master Batch (2) from Example 1 was applied as ½", 20 mil-thick lap on as received cold-roll steel and a fiberglass and polyester composite (SMC), commercially available from Budd Co. The thus coated substrates were exposed under atmospheric conditions to UV radiation from an Addalux medium pressure Hg lamp for 3 seconds to form a tack-free skin cure. The thus coated substrate was then clamped together with an uncoated substrate of the same material and heated at 140° C. in an air oven for 20 minutes. The samples were then measured for impact strength and lap shear strength of the adhesive. The adhesive between the steel substrates failed in the adhesive with an impact strength of 12 in.−lb./0.5 in.$^2$ and an average lap shear strength of 906 psi. over an average of 5 samples. The adhesive on the SMC substrate failed in the substrate with an average impact strength of 29 in.−lb./0.5 in.$^2$ and an average lap shear strength of 848 psi. over an average of 5 samples.

EXAMPLE 13

A ¼" thick line of master batch (1) from Example 1 was placed as a sealant on the line of intersection of 2 pieces of metal perpendicular to each other. The sealant line was exposed to UV radiation from an Addalux medium pressure HG lamp for 3 seconds under atmospheric conditions. A tack-free skin cure sufficient to hold the sealant in place and the metal pieces perpendicular to each other resulted. The assembly was then heated at 140° C. in an air oven for 25 minutes. A solid, cured sealant line resulted.

I claim:

1. A process for adhering two substrates which consists of applying to at least one of said substrates an adhesive composition consisting essentially of
   (1) a liquid, ethylenically unsaturated monomer, oligomer or prepolymer of the formula:

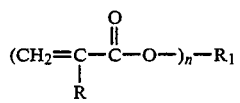

wherein R is H or CH$_3$, R$_1$ is an organic moiety and n is at least 2,
   (2) a thermal initiator for (1) selected from the group consisting of azo compounds, thiurams, organic peroxides and mixtures thereof,
   (3) a photoinitiator for (1) selected from the group consisting of aldehyde and ketone carbonyl compounds having at least one aromatic nucleus attached directly to the

group, benzoin alkyl ethers, diethoxyacetophenone and 2,2-dimethoxy-2-phenylacetophenone,
(4) a thermoplastic material, and
(5) a non-polymerizable plasticizer for (4), exposing said composition in air to UV radiation having an intensity in the range 0.0004 to 60.0 watts/cm$^2$ in the 200–400 nanometer region for a time sufficient to partially cure the adhesive in situ, contacting the substrates with the partially cured adhesive therebetween and, thereafter, heating the composition to a temperature in the range 80°–200° C. for a time sufficient to obtain a fully cured solid adhesive.

2. A process for sealing two substrates which consists of contacting said substrates, applying to the substrates at a line of contact a sealant composition consisting essentially of
(1) a liquid, ethylenically unsaturated monomer, oligomer or prepolymer of the formula:

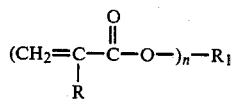

wherein R is H or CH$_3$, R$_1$ is an organic moiety and n is at least 2,
(2) a thermal initiator for (1) selected from the group consisting of azo compounds, thiurams, organic peroxides and mixtures thereof,
(3) a photoinitiator for (1) selected from the group consisting of aldehyde and ketone carbonyl compounds having at least one aromatic nucleus attached directly to the

group, benzoin alkyl ethers, diethoxyacetophenone and 2,2-dimethoxy-2-phenylacetophenone,
(4) a thermoplastic material, and
(5) a non-polymerizable plasticizer for (4), exposing said composition in air to UV radiation having an intensity in the range 0.0004 to 60.0 watts/cm$^2$ in the 200–400 nanometer region to obtain a tack-free skin cure of the sealant composition and, thereafter, heating the composition to a temperature in the range 80°–200° C. for a time sufficient to obtain a fully cured solid sealant.

3. A process for encapsulating an article which consists of coating said article with a UV and thermally curable composition consisting essentially of
(1) a liquid, ethylenically unsaturated monomer, oligomer or prepolymer of the formula:

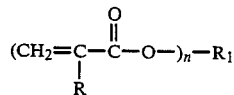

wherein R is H or CH$_3$, R$_1$ is an organic moiety and n is at least 2, (2) a thermal initiator for (1) selected from the group consisting of azo compounds, thiurams, organic peroxides and mixtures thereof,
(3) a photoinitiator for (1) selected from the group consisting of aldehyde and ketone carbonyl compounds having at least one aromatic nucleus attached directly to the

group, benzoin alkyl ethers, diethoxyacetophenone and 2,2-dimethoxy-2-phenylacetophenone,
(4) a thermoplastic material, and
(5) a non-polymerizable plasticizer for (4), exposing said composition in air to UV radiation having an intensity in the range 0.0004 to 60.0 watts/cm$^2$ in the 200–400 nanometer region to obtain a tack-free partial cure of said coating sufficient to hold it in situ and, thereafter, heating the composition to a temperature in the range 80°–200° C. for a time sufficient to obtain a fully cured, tack-free solid encapsulating coating.

4. The process of forming a cured coating on a substrate which consists of applying to a substrate a UV and thermally curable composition consisting essentially of
(1) a liquid, ethylenically unsaturated monomer, oligomer or prepolymer of the formula:

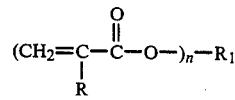

wherein R is H or CH$_3$, R$_1$ is an organic moiety and n is at least 2,
(2) a thermal initiator for (1) selected from the group consisting of azo compounds, thiurams, organic peroxides and mixtures thereof,
(3) a photoinitiator for (1) selected from the group consisting of aldehyde and ketone carbonyl compounds having at least one aromatic nucleus attached directly to the

group, benzoin alkyl ethers, diethoxyacetophenone and 2,2-dimethoxy-2-phenylacetophenone,
(4) a thermoplastic material, and
(5) a non-polymerizable plasticizer for (4), exposing said composition in air to UV radiation having an intensity in the range 0.0004 to 60.0 watts/cm$^2$ in the 200–400 nanometer region and, thereafter, heating the composition to a temperature in the range 80°–200° C. for a time sufficient to obtain a cured solid, tack-free product.

5. The process of forming a cured product which consists of admixing a UV and thermally curable composition consisting essentially of
(1) a liquid, ethylenically unsaturated monomer, oligomer or prepolymer of the formula:

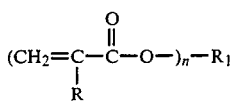

wherein R is H or CH₃, $R_1$ is an organic moiety and n is at least 2, (2) a thermal initiator for (1) selected from the group consisting of azo compounds, thiurams, organic peroxides and mixtures thereof, (3) a photoinitiator for (1) selected from the group consisting of aldehyde and ketone carbonyl compounds having at least one aromatic nucleus attached directly to the

group, benzoin alkyl ethers, diethoxyacetophenone and 2,2-dimethoxy-2-phenylacetophenone, (4) a thermoplastic material, and (5) a non-polymerizable plasticizer for (4), exposing said composition in air to UV radiation having an intensity in the range 0.0004 to 60.0 watts/cm² in the 200–400 nanometer region and, thereafter, heating the composition to a temperature in the range 80°–200° C. for a time sufficient to obtain a fully cured solid, tack-free product.

6. The product obtained by the process of claim 5.

7. A UV and thermally curable composition consisting of (1) a liquid, ethylenically unsaturated monomer, oligomer or prepolymer of the formula:

(CH₂=C—C(=O)—O—)ₙ—R₁ with substituent R wherein R is H or CH₃, $R_1$ is an organic moiety and n is at least 2, (2) a thermal initiator for (1) selected from the group consisting of azo compounds, thiurams, organic peroxides and mixtures thereof, (3) a photoinitiator for (1) selected from the group consisting of aldehyde and ketone carbonyl compounds having at least one aromatic nucleus attached directly to the

group, benzoin alkyl ethers, diethoxyacetophenone and 2,2-dimethoxy-2-phenylacetophenone, (4) a thermoplastic material, and (5) a non-polymerizable plasticizer for (4).

8. The composition of claim 7 wherein (2) is an organic peroxide, (3) is 2-hydroxy-2-methyl-1-phenylpropan-1-one, (4) is polyvinyl chloride and (5) is an adipate polyester plasticizer.

9. The composition of claim 7 wherein (2) is an organic peroxide, (3) is 2-hydroxy-2-methyl-1-phenylpropan-1-one, (4) is a vinyl acetate-vinyl chloride copolymer and (5) is an adipate polyester plasticizer.

10. The composition of claim 7 wherein (2) is an organic peroxide, (3) is 2-hydroxy-2-methyl-1-phenylpropan-1-one, (4) is a methyl methacrylate, butyl methacrylate and vinyl imidazole terpolymer and (5) is diisononylphthalate.

* * * * *